United States Patent
Marin

(10) Patent No.: US 10,162,609 B2
(45) Date of Patent: Dec. 25, 2018

(54) MODEL-DRIVEN OBJECT COMPOSITION FOR DATA ACCESS USING FUNCTION-EXPRESSIONS

(71) Applicant: Microsoft Technology Licensing, LLC, Redmond, WA (US)

(72) Inventor: Adrian Marius Marin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 14/468,760

(22) Filed: Aug. 26, 2014

(65) Prior Publication Data
US 2016/0062742 A1  Mar. 3, 2016

(51) Int. Cl.
*G06F 9/44*   (2018.01)
*G06F 8/35*   (2018.01)

(52) U.S. Cl.
CPC ..................... *G06F 8/35* (2013.01)

(58) Field of Classification Search
CPC ........................................................ G06F 8/35
USPC ........................................................ 717/108
See application file for complete search history.

(56) References Cited

U.S. PATENT DOCUMENTS

| | | | | |
|---|---|---|---|---|
| 5,307,445 A * | 4/1994 | Dalal | ..................... | G06N 5/003 706/56 |
| 7,917,915 B2 * | 3/2011 | Bonnette | ................... | G06F 8/20 715/762 |
| 7,970,777 B2 * | 6/2011 | Saxena | ............. | G06F 17/30389 707/708 |
| 8,276,112 B2 | 9/2012 | Fritzsche et al. | | |
| 8,312,418 B2 | 11/2012 | Cowan et al. | | |
| 8,843,883 B2 * | 9/2014 | Chowdhary | ........... | G06Q 10/06 717/105 |
| 9,165,043 B2 * | 10/2015 | Jin | ..................... | G06F 17/30545 |
| 9,298,767 B1 * | 3/2016 | Braksator | ......... | G06F 17/30386 |
| 2006/0101393 A1 * | 5/2006 | Gerken | ..................... | G06F 8/30 717/109 |
| 2008/0313008 A1 * | 12/2008 | Lee | ........................ | G06Q 10/06 705/7.23 |

(Continued)

FOREIGN PATENT DOCUMENTS

CN   103412747 A   11/2013

OTHER PUBLICATIONS

Balasubramanian, et al., "Developing Applications Using Model-Driven Design Environments", In Proceedings of computer, vol. 39, Issue 2, Feb. 2006, pp. 33-40.

(Continued)

*Primary Examiner* — Evral E Bodden
(74) *Attorney, Agent, or Firm* — Christopher R. Christenson; Kelly, Holt & Christenson PLLC

(57) ABSTRACT

A computer-implemented method for creating an object for data access is provided. The computer-implemented method includes defining a function-expression in source code using an object-oriented programming language. The defined function-expression is exposed in a graphical user interface of a development tool used to create the object. A selection of at least one field among a list of available fields for data access is received. The defined function-expression is included in the list of available fields. An integrated development environment is also provided.

17 Claims, 7 Drawing Sheets

(56) References Cited

U.S. PATENT DOCUMENTS

| | | | |
|---|---|---|---|
| 2011/0125773 A1* | 5/2011 | Jin ................... | G06F 17/30545 |
| | | | 707/760 |
| 2014/0129583 A1* | 5/2014 | Munkes ............ | G06F 17/30967 |
| | | | 707/760 |

OTHER PUBLICATIONS

Parreiras, et al., "Model Driven Development with Semantic Web Technologies", In Tutorial at the 6th European Conference on Modeling Foundations and Applications ECMFA, Jun. 15, 2010, 9 pages.

* cited by examiner

MODEL-DRIVEN OBJECT COMPOSITION FOR DATA ACCESS USING FUNCTION-EXPRESSIONS

BACKGROUND

Complex computer systems are sometimes designed and/or customized using model-driven software engineering. In such software engineering systems, models are created and interacted with, and such interaction automatically creates underlying code. In this way, complex systems can be built or customized more quickly than would otherwise be possible if the software engineer or developer were to write each individual line of code.

Generally, a model includes objects and relations between objects in accordance with a defined format. An object may occur in one or more models. When data access is required in the software, a development environment may provide the developer with an indication of the models and allow the developer to select various objects and to determine various parameters in order to build a data access object.

Current techniques for model-driven development of composite objects for data access, i.e., queries, integrated with modern development environments and graphical user interfaces (GUI), require the developer to use either basic component-objects and operations exposed in the UI or to write expressions in a dedicated language, such as an expression or formula language.

The discussion above is merely provided for general background information and is not intended to be used as an aid in determining the scope of the claimed subject matter.

SUMMARY

A computer-implemented method for creating an object for data access is provided. The computer-implemented method includes defining a function-expression using an object-oriented programming language. The defined function-expression is exposed in a graphical user interface of a development tool used to create the object. A selection of at least one field among a list of available fields for data access is received. The defined function-expression is included in the list of available fields. An integrated development environment is also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As set forth above, current techniques for model-driven development of composite objects for data access require the developer to use basic modeling component-objects and operations exposed in the user interface of an integrated development environment or to write expressions in a dedicated language, such as an expression or formula language. The first approach limits the complexity of the objects that the developer can model due to an inherent lack of expressiveness in the GUI modeling tools when it comes to modeling complex expressions with multiple operations on data (sub-) sets or conditions on selected data. The second approach requires the developer to learn a purpose-specific language in order to define expressions and compositions of such expressions that make up the queries. Embodiments described herein allow the complete flexibility of code generation and interacting with the objects while maintaining much of the simplicity and efficiency of GUI modeling tools. More specifically, embodiments described herein allow a developer to model complex objects for data-access using a model-driven approach and object-oriented programming techniques, and seamlessly integrate between the two.

Figure 1:
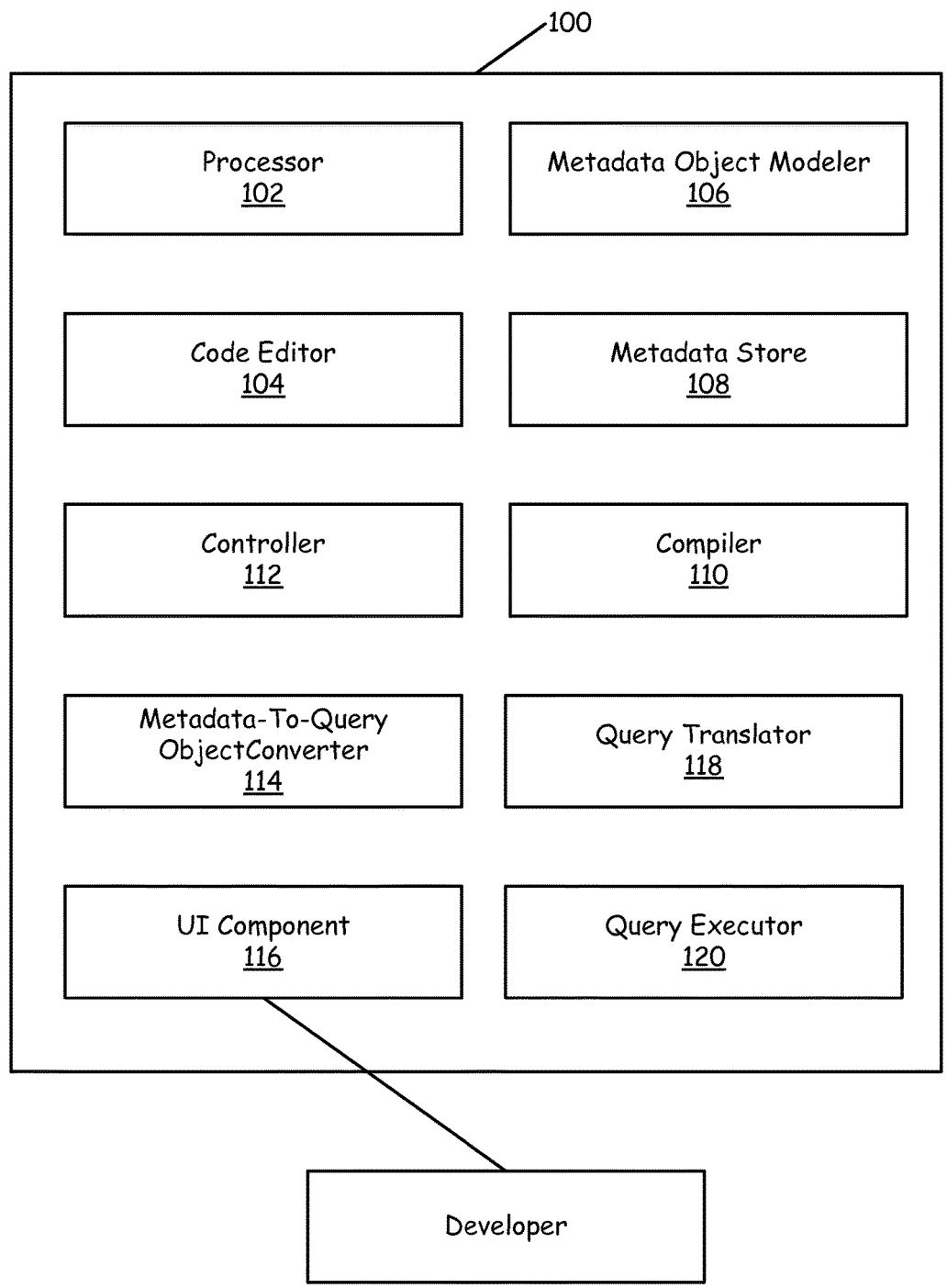
FIG. 1 is a functional block diagram of an integrated development environment with which embodiments described herein are useful.

FIG. 1 is a functional block diagram of an integrated development environment with which embodiments described herein are useful. Integrated development environment 100 includes a processor 102, code editor 104, metadata object modeler 106, metadata store 108, compiler 110, controller 112, metadata-to-query object converter 114, user interface (UI) component 116, query translator 118 and query executor 120.

Processor 102 is coupled to UI component 116 and interacts with a user in order to generate or customize software. Processor 102 also populates various menus in the graphical user interface as a developer or user interacts with development environment 100. In some embodiments, environment 100 may be implemented on a single computer, however, it is expressly contemplated that environment 100 may be implemented on a plurality of computers located near the user or in a cloud computing environment. Code editor 104 allows the developer to enter code that will be compiled by compiler 110 for execution by a computer. Metadata object modeler 106 allows the developer to create data access objects (such as queries) that are modeled by the system and to describe or otherwise define such data access objects. Metadata store 108 stores all of the modeled objects and metadata describing such objects, in a suitable descriptive language, such as extensible markup language (XML). Compiler 110 compiles source code generated by the developer into machine-executable code. In one embodiment, compiler 110 is configured to compile C# object-oriented code. Controller 112 is configured, in accordance with one embodiment, to orchestrate the transformation of modeled metadata objects into corresponding strings in a query language understood by a database server. Additionally, controller 112 orchestrates the execution of the query on the server in order to retrieve data. Metadata-to-query Object Converter 114 is configured to read/parse the metadata description of the modeled object for data access and to create a data access object based on the metadata description. Query Translator 118 is configured to read/parse the query object created by Metadata-to-query object converter 114 and generate a query statement/string in a target language that is understood by a database server, for example, Multidimensional Expressions (MDX), SQL and others. Query Executor 120 is configured to receive the query statement/string from query translator 118 and execute the query on a target database server and to receive query results from the target database server.

As defined herein, a function-expression is an object method written in the object-oriented language of the developer's choice that has an indication that it should be exposed in the graphical user interface of the development environment. In one embodiment, the indication is a return value of the function-expression that has a type, e.g., Scalar or SetExpression, where the latter is a generic type for n-tuple sets. Suitable examples of object-oriented languages include C#, Java and C++, among others.

Figure 2:
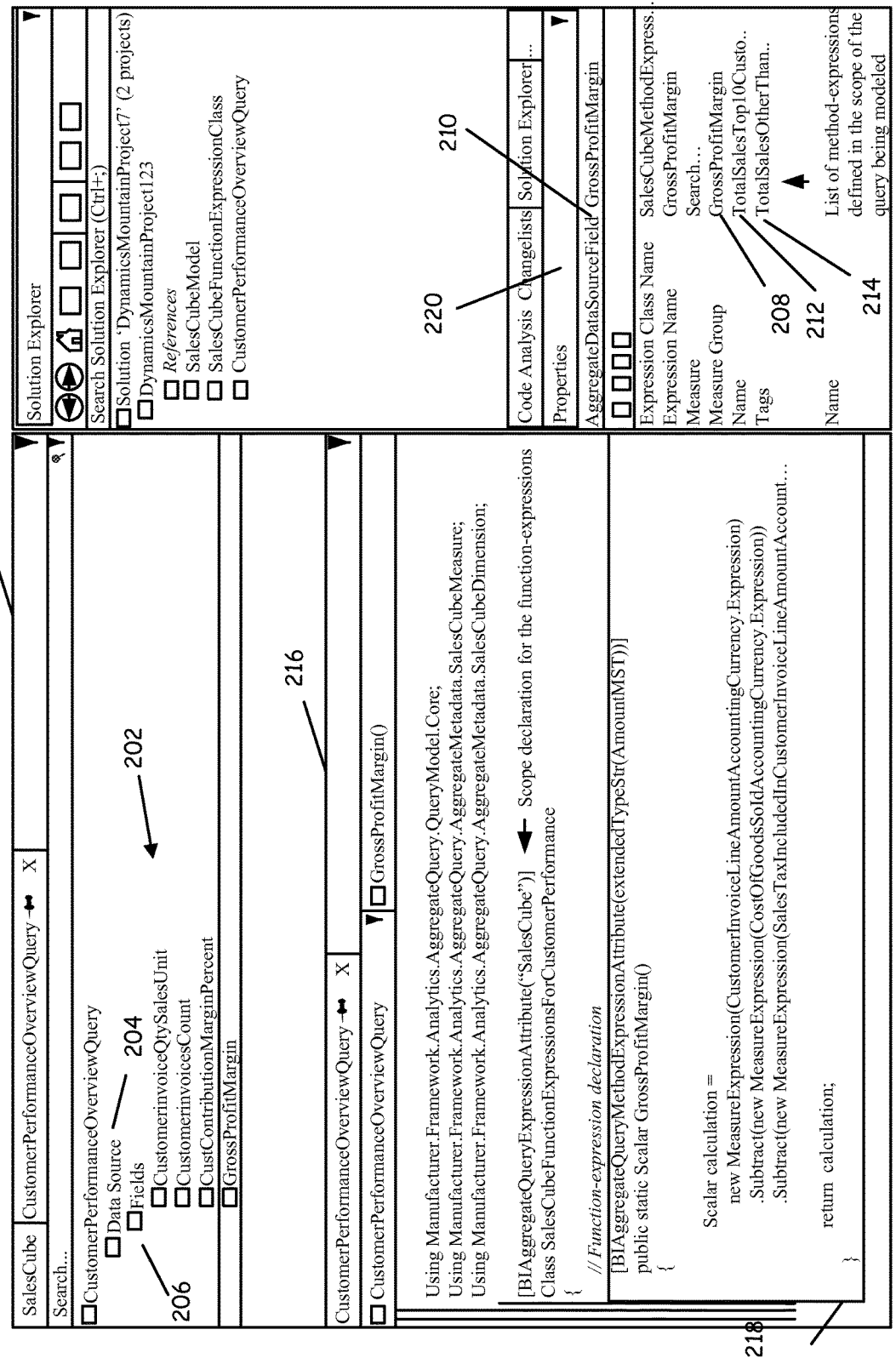
FIG. 2 is a screenshot on an integrated development environment being employed to create a composite data access object in accordance with an embodiment.

FIG. 2 is diagrammatic screenshot from an integrated development environment being employed to create a composite data access object in accordance with an embodiment. FIG. 2 illustrates how the developers can model query objects for data access by defining custom query expressions in code and then seamlessly creating compositions with other objects using the interface for model-driven development of queries in the development environment 100. The query in the example selects three fields with simple mappings onto objects of the data model and a fourth one that is defined by a function-expression that models an expression that can combine multiple objects in the data model and apply operations, e.g., logic or arithmetic, or pre-defined functions on those objects.

Screen 200 includes model portion 202 where an object for data access is created and defined. In the illustrated embodiment, an object entitled CustomerPerformanceOverviewQuery is being created. A data source selector 204 allows the developer to select one or more data sources against which the data access object will operate. Field selector portion 206 allows the developer to define various fields for the object. As shown in the lower right-hand portion of FIG. 2, one of the fields selected, as indicated at reference numeral 208, is "GrossProfitMargin" in AggregateDataSourceField window 210. As can be seen in the example, other function-expressions 212 ("TotalSalesTop10Customers") and 214 ("TotalSalesOtherThanTop10Customers") are available. These function-expressions are provided in object-oriented source code that is attributed in a certain way such that they will be exposed in the graphical user interface of integrated development environment 100. The actual definition of each function-expression is provided in code editor window 216. For the GrossProfitMargin function-expression, the object-oriented source code is provided in block 218. The code snippet shows a simple function-expression declaration that returns a Scalar type object for the result of the calculation for the gross profit. The function decorations shown in the example are used to associate semantics to the function-expressions. For example, for formatting purposes, the numeric scalar returned by the function-expression GrossProfitMargin is an amount that will be displayed in the query result using the formatting for currencies. The object-oriented code set forth in block 218 is attributed a certain way such that it will appear in the dropdown menus available in model portion 202. In one embodiment, this attribute is set at the class level. The attribute at the class level ([BIAggregateQueryExpressionAttribute("SalesCube")]) indicates that the function-expressions in that class are to be shown in the drop-down of any query that queries the "SalesCube" datasource. In the example shown, the attribute on the method: [BIAggregateQueryExpressionAttribute(extendedTypeStr(AmountMST))] is an addition indication of the semantics of the value returned by the function-expression. That is, function-expressions are recognized by their signature, e.g., the fact that they return a Scalar type. This attribute tells the framework that the scalar type represents an amount and this information can be used for formatting. However, those skilled in the art will recognize that other identifiers or signatures of the object-oriented code can be used to surface such functions or methods in the GUI of the integrated development environment in accordance with various methods described herein.

The association between the fields of a modeled query and the function-expressions created programmatically in code is done through Properties window 220 (shown at the bottom-right in FIG. 2), where the developer can select a function-expression for the field or, alternatively, can open a code editor window to enter the function-expression.

A Save (static, build-time) or Run (runtime) operation on the modeled data access object triggers a procedure that will create an instance of the object-model for that data access object by using reflection-like mechanisms that are able to examine and modify the structure and behavior of the software at runtime to invoke the function-expressions that make up the data access object. The data access object is then translated to a query string in a supported target query language, such as SQL or MDX.

When development environment 100 parses the object-oriented code to determine which elements should be shown in the dropdown menus, processor 102 attempts to identify the specific signature of function-expressions such that only those function-expressions are shown in the dropdown menus.

Figure 3:
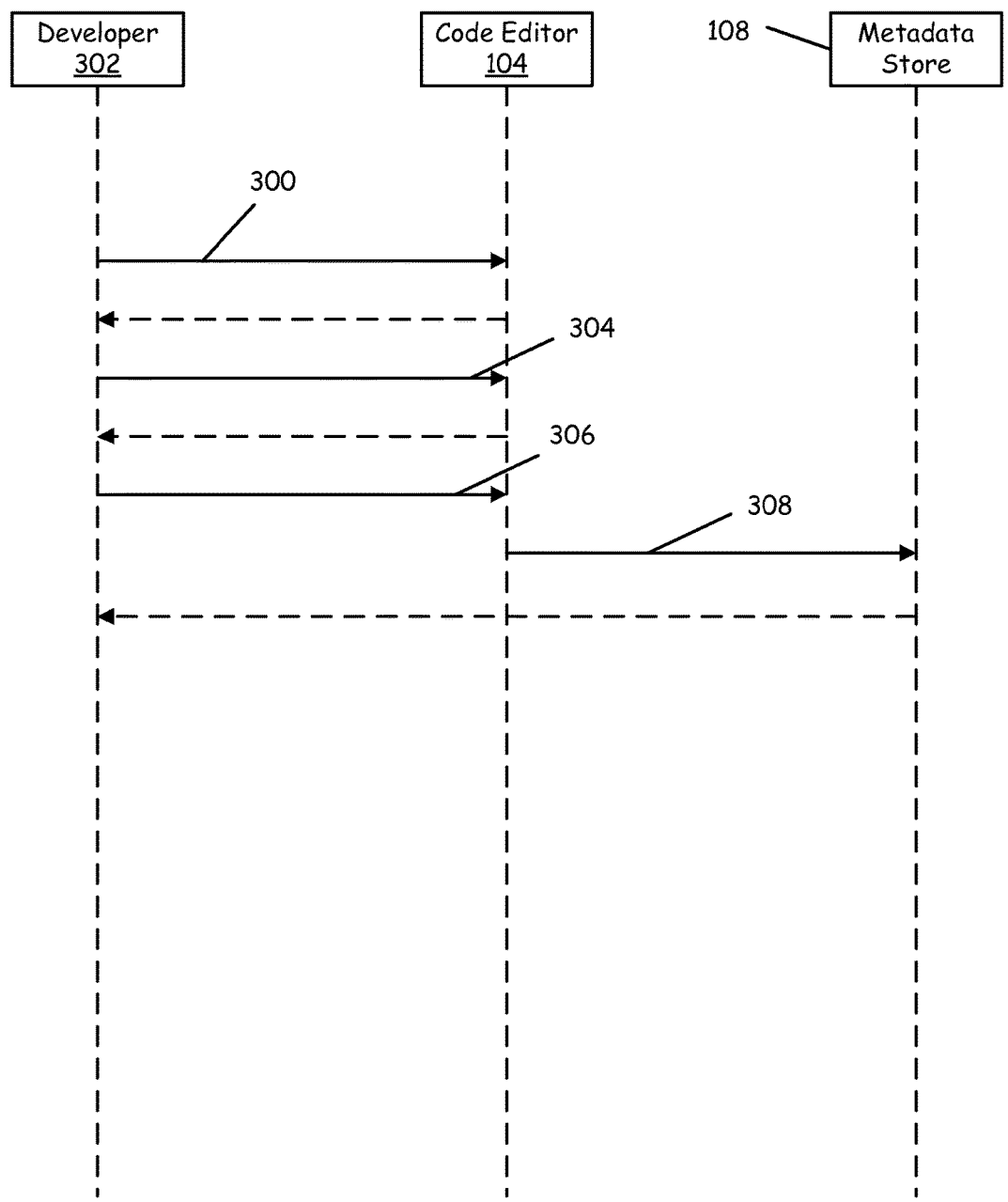
FIG. 3 is an activity diagram of a method of creating a function for use in a composite data access object in accordance with an embodiment.

FIG. 3 is an activity diagram of a method of creating a function-expression for use in a composite data access object in accordance with an embodiment. Initially, at line 300, developer 302 creates a function-expression by authoring object-oriented code in a code editor of a development environment, such as code editor window 216 (shown in FIG. 2). Then, developer 302 gives the function-expression a specific signature, in this case a return type, that indicates that the object-oriented code is a function-expression, as indicated at line 304. The developer then indicates to the development environment that the function-expression should be saved, as shown at line 306. Code editor 104 then saves the function-expression in metadata store 108, as indicated by line 308. The stored function-expression may now be used to build data access objects.

Figure 4:
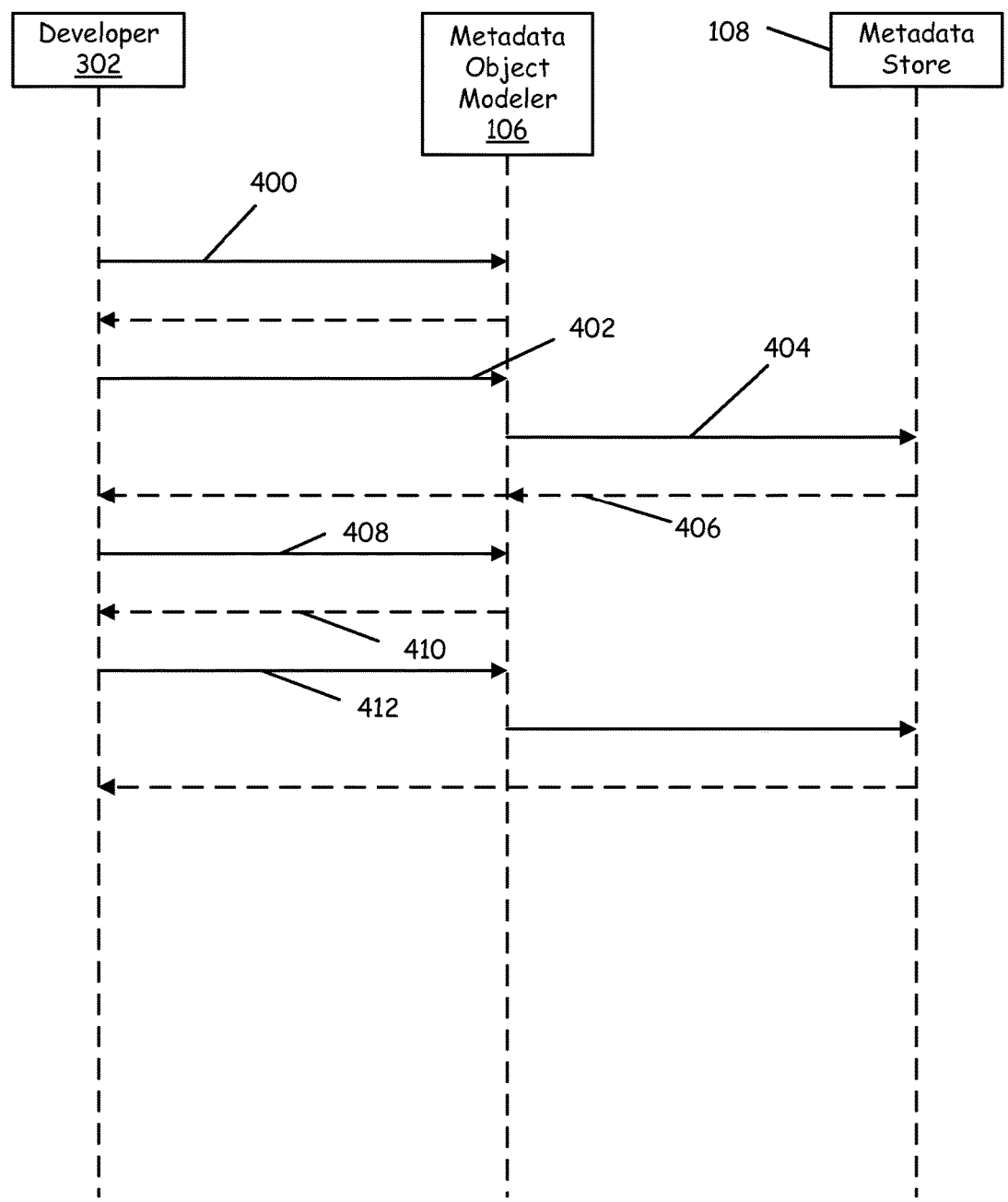
FIG. 4 is an activity diagram of a method of creating a composite data access object in accordance with an embodiment.

FIG. 4 is an activity diagram of a method of creating a composite data access object in accordance with an embodiment. FIG. 4 illustrates modeling of the data access object. At line 400, developer 302 creates an object in the development environment using metadata object modeler 106 (shown in FIG. 1). Next, developer 302 adds a field to the data access object, as indicated at line 402. When this happens, the development environment obtains a list of function-expressions from metadata store 108 as indicated at line 404. The list of function-expressions is used to populate the drop-down in properties window 220, as indicated at line 406. The populated drop-down is shown to developer 302 and a function-expression is selected from the drop-down menu, as indicated at line 408. Then, at line 410, the field definition is updated with the selected function-expression. Finally, at line 412, the data access object is saved or otherwise persisted in metadata store 108.

Figure 5:
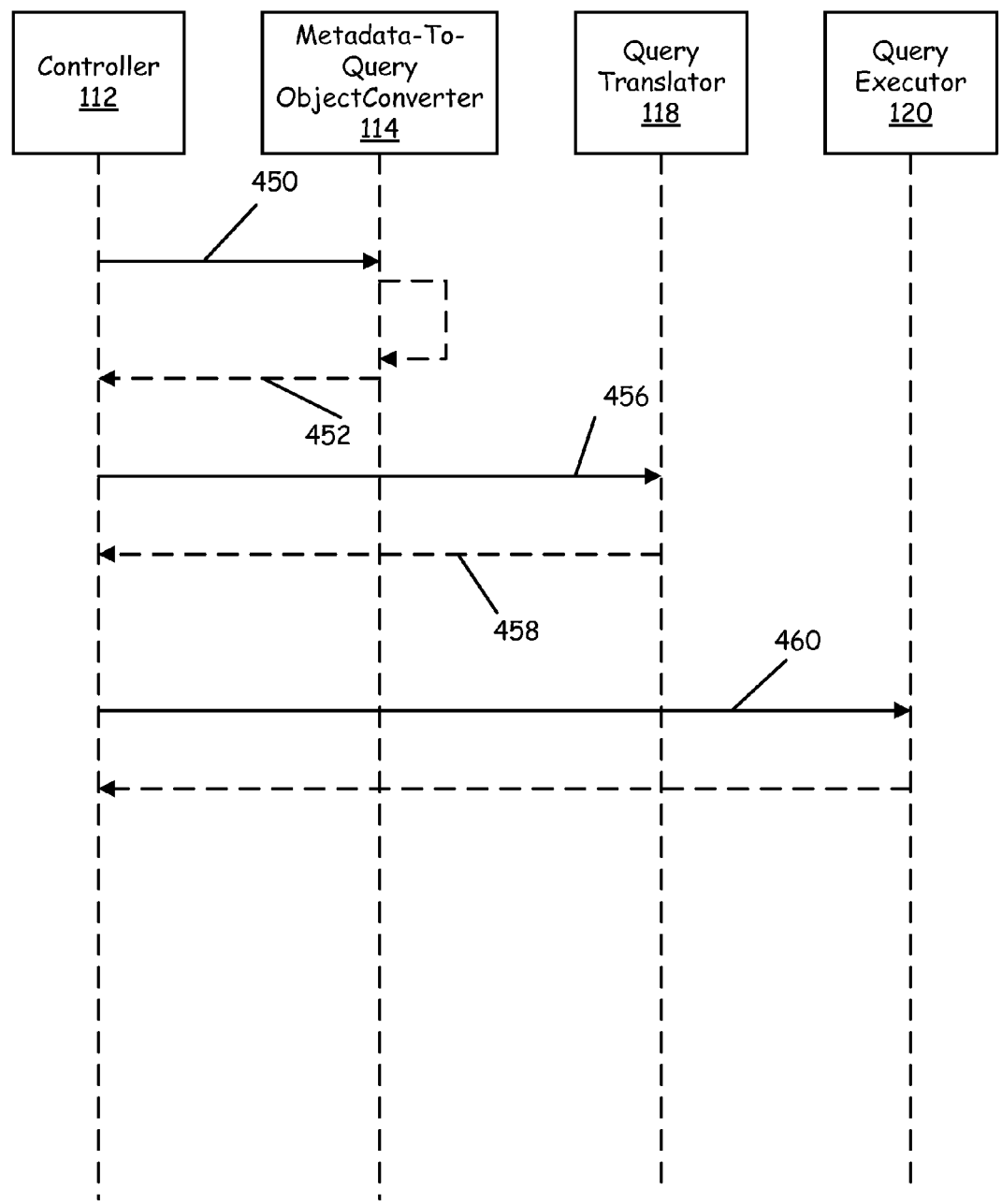
FIG. 5 is an activity diagram of a method applying a composite data access object to access a data source in accordance with an embodiment.

FIG. 5 is an activity diagram of a method for applying a composite data access object to access a data source in accordance with an embodiment. At run-time, controller 112 causes the metadata description of the data access object to be read/parsed by Metadata-to-query Object Converter 114 which converts the metadata description of the modeled object into a query object, as indicated at line 450. Metadata-to-query converter 114 then calls the function-expression(s) by name using suitable technology, such as reflection, and returns the aggregate query object to controller 112, as indicated at line 452. Controller 112 then passes the object to query translator 118, as indicated at line 456. Query translator 118 translates the aggregate query object to a query string in a target query language, such as MDX, and passes the string back to controller 112, as indicated at line 458. Controller 112 then passes the query string to query executor 120 to execute the query string received from query translator 118 on a target server, as indicated at line 460. In this way, the developer has the ability to remain in the object-oriented programming environment without being forced to employ scripting languages.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
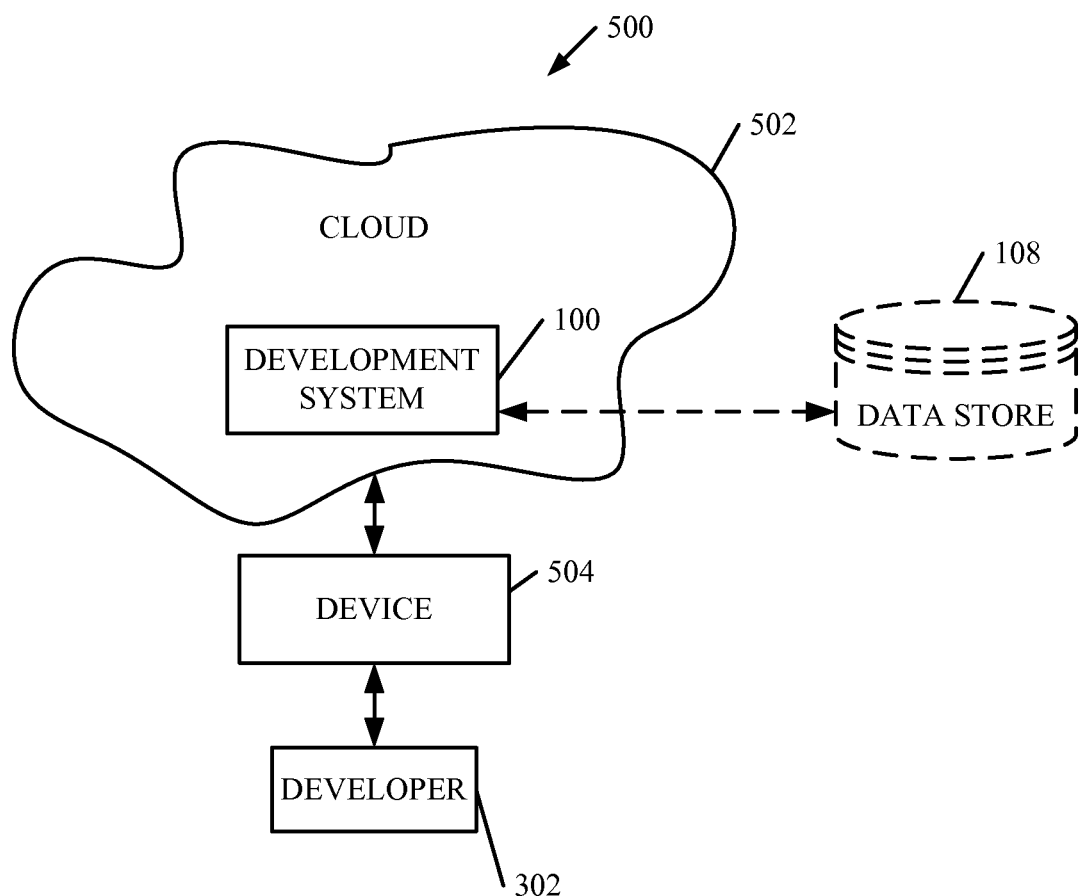
FIG. 6 is a diagrammatic view of an integrated development environment deployed in a cloud computing architecture in accordance with an embodiment.

FIG. 6 is a block diagram of development environment 100, shown in FIG. 1, except that its elements are disposed in a cloud computing architecture 500. Cloud 502 is composed of at least one server computer, but may also include other interconnected devices, computers or systems. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of development environment 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that integrated development environment 100 is located in cloud 502 (which can be public, private, or a combination where portions are public while others are private). Therefore, developer 302 uses a device 504 to access those systems through cloud 502.

FIG. 6 also depicts another embodiment of a cloud architecture. FIG. 6 shows that it is also contemplated that some elements of development environment 100 are disposed in cloud 502 while others are not. By way of example, metadata store 108 can be disposed outside of cloud 502, and accessed through cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that development environment 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
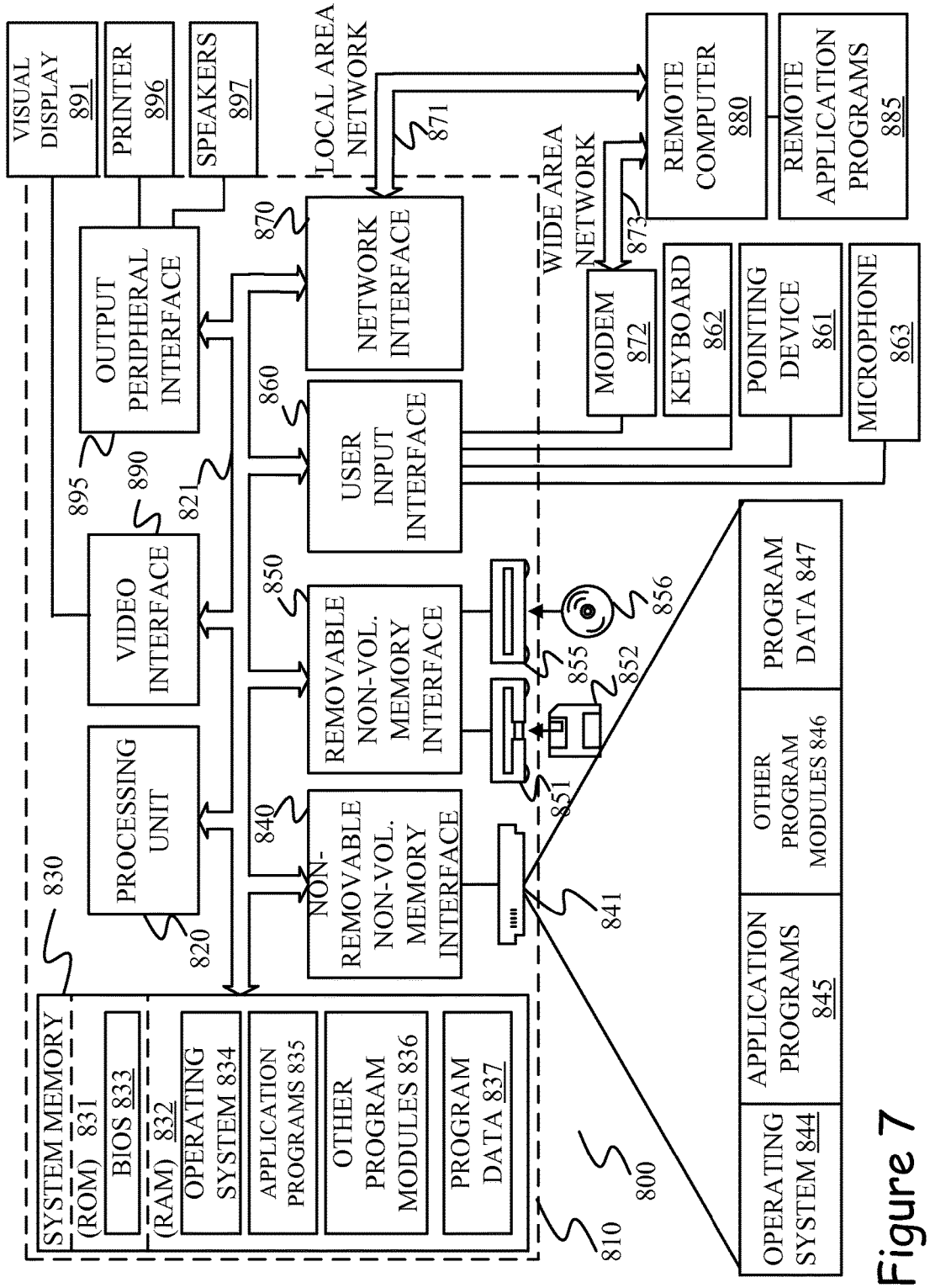
FIG. 7 is one embodiment of a computing system in which an integrated development environment, or parts of it, (for example) can be deployed.

FIG. 7 is one embodiment of a computing environment in which development environment 100, or parts of it, (for example) can be deployed. With reference to FIG. 7, an exemplary system for implementing some embodiments includes a general-purpose computing device in the form of a computer 810. Components of computer 810 may include, but are not limited to, a processing unit 820 (which can comprise processor 124, 186 or 190), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

Embodiments described above provide a software engineer or developer with the flexibility of code generation for data access objects as well as the intuitive, rapid development provided by GUI modeling tools. This allows the developer to work more efficiently without requiring the developer to learn a dedicated expression language for data access. Additionally, embodiments described above are believed to provide increased productivity by means of reducing error proneness and by use of development techniques that are significantly easier to apprehend.

It should also be noted that the different embodiments described herein can be combined in different ways. That is, parts of one or more embodiments can be combined with parts of one or more other embodiments. All of this is contemplated herein.

Example 1 is a computer-implemented method for creating an object for data access. The computer-implemented method includes defining a function-expression in source code using an object-oriented programming language. The defined function-expression is exposed in a graphical user interface of a development tool used to create the object. A selection of at least one field among a list of available fields for data access is received. The defined function-expression is included in the list of available fields.

Example 2 is a computer-implemented method of any or all of the previous examples, wherein the function-expression is stored with the object for data access.

Example 3 is a computer-implemented method of any or all of the previous examples, wherein the method includes an indication that it should be displayed in the graphical user interface.

Example 4 is a computer-implemented method of any or all of the previous examples, wherein the indication is a signature.

Example 5 is a computer-implemented method of any or all of the previous examples, wherein the indication is return type.

Example 6 is a computer-implemented method of any or all of the previous examples, and further comprising storing the object for data access in a metadata store.

Example 7 is a computer-implemented method of any or all of the previous examples, wherein defining the method includes receiving object-oriented source code in a code editor of the development tool.

Example 8 is a computer-implemented method of any or all of the previous examples, and further comprising converting the object for data access into a string and transmitting the string to a target data source.

Example 9 is an integrated development environment including a processor, a metadata store coupled to the processor and configured to store object metadata, a metadata object modeler configured to allow creation of an object for data access, and a code editor configured to receive object-oriented source code indicative of at least one function-expression that is displayed as a menu element in a graphical user interface of the integrated development environment. The displayed function-expression is selectable for inclusion in the object for data access.

Example 10 is an integrated development environment of any or all of the previous examples, wherein the code editor is configured to receive an indication that the function-expression should be displayed as a menu element in the graphical user interface.

Example 11 is an integrated development environment of any or all of the previous examples, wherein the indication is a return type of the method.

Example 12 is an integrated development environment of any or all of the previous examples, and further comprising a user interface element component configured to generate the graphical user interface of the integrated development environment.

Example 13 is an integrated development environment of any or all of the previous examples, wherein the graphical user interface includes a model portion where the object is defined.

Example 14 is an integrated development environment of any or all of the previous examples, wherein the graphical user interface includes a code editor window.

Example 15 is an integrated development environment of any or all of the previous examples, wherein the graphical user interface includes a data source selector to receive an indication of at least one data source on which the object will operate.

Example 16 is an integrated development environment of any or all of the previous examples, wherein the graphical user interface further comprises a portion allowing association between fields of the object and the method.

Example 17 is an integrated development environment of any or all of the previous examples, wherein the integrated development environment is embodied on a single computer.

Example 18 is an integrated development environment of any or all of the previous examples, wherein the integrated development environment is embodied in a cloud computing architecture.

Example 19 is an integrated development environment of any or all of the previous examples, and further comprising: a query controller; a query converter; and a string generator. The query controller, query converter and string generator cooperate to translate the object into a string that is operable against a target data source.

Example 20 is a computer-implemented method for creating an object for data access. The computer-implemented the method includes defining a function-expression in a graphical user interface of a development environment using an object-oriented programming language. The function-expression is attributed to surface as a menu element in the graphical user interface. The defined function-expression is surfaced in the graphical user interface of a development tool used to create the object. The function-expression is included in the object for data access. The object is stored in a metadata store. At run-time, the object is retrieved from the metadata store and converted to a string that is operable against a target data source. The string is executed against the target data source to access data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Embodiments described herein are particularly applicable to complex computer system, such as an enterprise resource planning (ERP) system, a customer relations management (CRM) system, a line-of-business (LOB) system, among others. However, embodiments described herein provide advantages whenever a data access object is required in a model-driven system.

What is claimed is:

1. A computer-implemented method for creating an object for data access, the method comprising:
  receiving user input object-oriented source code in a code editor of a graphical user interface of a development tool;
  creating a function-expression with the object-oriented source code as an object method that includes an indication that the function-expression should be displayed in a graphical user interface of a development tool;
  displaying the defined function-expression in a list of available fields for data access in the graphical user interface of the development tool used to create the object;
  receiving a selection of a field among a list of available fields for data access;
  creating the object for data access based on the selection; and
  saving the object for data access in a metadata store.

2. The computer-implemented method of claim 1, and further comprising combining multiple fields defined as function-expressions to build the object for data access.

3. The computer-implemented method of claim 1, wherein the function-expression is stored with the object for data access.

4. The computer-implemented method of claim 3, wherein the indication is selected from the group consisting of a signature, a source code attribute, and a property.

5. The computer-implemented method of claim 1, and further comprising converting the object for data access into a string and transmitting the string to a target data source.

6. An integrated development environment comprising:
  a processor;
  a metadata store coupled to the processor and configured to store object metadata;
  a metadata object modeler configured to allow creation of an object for data access;
  a code editor configured to receive user input object oriented source code that creates a function-expression that is displayed as a menu element in a graphical user interface of the integrated development environment; and
  wherein the displayed function-expression is selectable for inclusion in the object for data access.

7. The integrated development environment of claim 6, wherein the code editor is configured to receive an indication that the function-expression should be displayed as a menu element in the graphical user interface.

8. The integrated development environment of claim 7, wherein the indication is a return type of the function-expression.

9. The integrated development environment of claim 6, and further comprising a user interface element component configured to generate the graphical user interface of the integrated development environment.

10. The integrated development environment of claim 9, wherein the graphical user interface includes a model portion where the object is defined.

11. The integrated development environment of claim 9, wherein the graphical user interface includes a code editor window.

12. The integrated development environment of claim 9, wherein the graphical user interface includes a data source selector to receive an indication of at least one data source on which the object will operate.

13. The integrated development environment of claim 9, wherein the graphical user interface further comprises a portion allowing association between fields of the object and the function-expression.

14. The integrated development environment of claim 9, wherein the integrated development environment is embodied on a single computer.

15. The integrated development environment of claim 6, wherein the integrated development environment is embodied in a cloud computing architecture.

16. The integrated development environment of claim 6, and further comprising:
  a controller;
  a metadata-to-query object converter; and
  a query translator, wherein the controller, metadata-to-query object converter and query translator cooperate to translate the object into a string that is operable against a target data source.

17. A computer-implemented method for creating an object for data access, the method comprising:
  receiving user input in an object-oriented programming language that creates a function-expression in a graphical user interface of a development environment, the function expression being attributed to surface as a menu element in the graphical user interface;
  surfacing the defined function-expression in the graphical user interface of a development tool used to create the object for data access;
  including the function-expression in the object for data access;
  storing the data indicative of the object for data access in a metadata store using a descriptive language;
  retrieving, at run-time, the data indicative of the object for data access from the metadata store;
  using a metadata-to-object converter to create a data access object;
  using a query translator to convert the data access object to a string that is operable against a target data source; and
  executing the string against the target data source to access data.

* * * * *